US012705442B2

(12) United States Patent
Kageyama

(10) Patent No.: US 12,705,442 B2
(45) Date of Patent: Aug. 11, 2026

(54) CARD READER

(71) Applicant: Hitachi Channel Solutions, Corp., Tokyo (JP)

(72) Inventor: Takeshi Kageyama, Tokyo (JP)

(73) Assignee: HITACHI CHANNEL SOLUTIONS, CORP., Tokyo (JP)

( * ) Notice: Subject to any disclaimer, the term of this patent is extended or adjusted under 35 U.S.C. 154(b) by 0 days.

(21) Appl. No.: 19/078,583

(22) Filed: Mar. 13, 2025

(65) Prior Publication Data

US 2025/0371294 A1 Dec. 4, 2025

(30) Foreign Application Priority Data

May 31, 2024 (JP) ................................. 2024-088456

(51) Int. Cl.
*G06K 7/08* (2006.01)
*G06K 13/08* (2006.01)

(52) U.S. Cl.
CPC .................................... *G06K 7/084* (2013.01)

(58) Field of Classification Search
CPC ............... G06K 17/0022; G06K 7/084; G06K 7/10861; G06K 7/00; G06K 7/087; G06K 19/0717; G06K 7/0021; G06K 7/10128; G06K 13/067; G06K 7/10; G06K 19/0728; G07F 19/20; G07F 19/2055; G07F 17/246; G07F 7/0873; G07F 7/0893; G07F 7/0833
See application file for complete search history.

(56) References Cited

U.S. PATENT DOCUMENTS

2004/0035929 A1* 2/2004 Okada .................... G06K 13/08 235/438
2012/0138676 A1* 6/2012 Ma ........................... G07D 7/12 235/379

(Continued)

FOREIGN PATENT DOCUMENTS

CA 3090645 A1 * 8/2019 ......... G07F 19/2055
JP 2017-219971 A 12/2017

(Continued)

OTHER PUBLICATIONS

A Review on Big Data With Machine Learning and Fuzzy Logic for Better Decision Making (Year: 2019).*
PC based Ultrasonic Intrusion Detection System (Year: 2018).*

*Primary Examiner* — Thien T Mai
(74) *Attorney, Agent, or Firm* — Volpe Koenig

(57) ABSTRACT

To ensure reliable detection of a skimming device over an extensive area inside the card reader, it is currently necessary to install a large number of sensors, which may lead to increased manufacturing cost. A card reader for reading magnetic information while feeding, through a feed path, a card inserted into the card reader, includes: an oscillator configured to emit an ultrasonic wave to the feed path; and a receiver configured to receive the ultrasonic wave emitted from the oscillator. The card reader is configured to detect an object present in the feed path by comparing a first received waveform and a second received waveform with each other, the first received waveform being a waveform received at the receiver, the second received waveform being a previously acquired waveform under normal condition received at the receiver.

13 Claims, 10 Drawing Sheets

(56) References Cited

U.S. PATENT DOCUMENTS

| | | | | |
|---|---|---|---|---|
| 2013/0069299 | A1* | 3/2013 | Matsuoka | B65H 5/06 271/225 |
| 2017/0351880 | A1 | 12/2017 | Ozawa et al. | |
| 2020/0050803 | A1 | 2/2020 | Mochida | |
| 2021/0064871 | A1* | 3/2021 | Sohn | G06F 3/0482 |

FOREIGN PATENT DOCUMENTS

| | | | | |
|---|---|---|---|---|
| JP | 2020-024537 | A | 2/2020 | |
| WO | WO-2019160834 | A1 * | 8/2019 | G06F 16/906 |

* cited by examiner

FIG. 5B

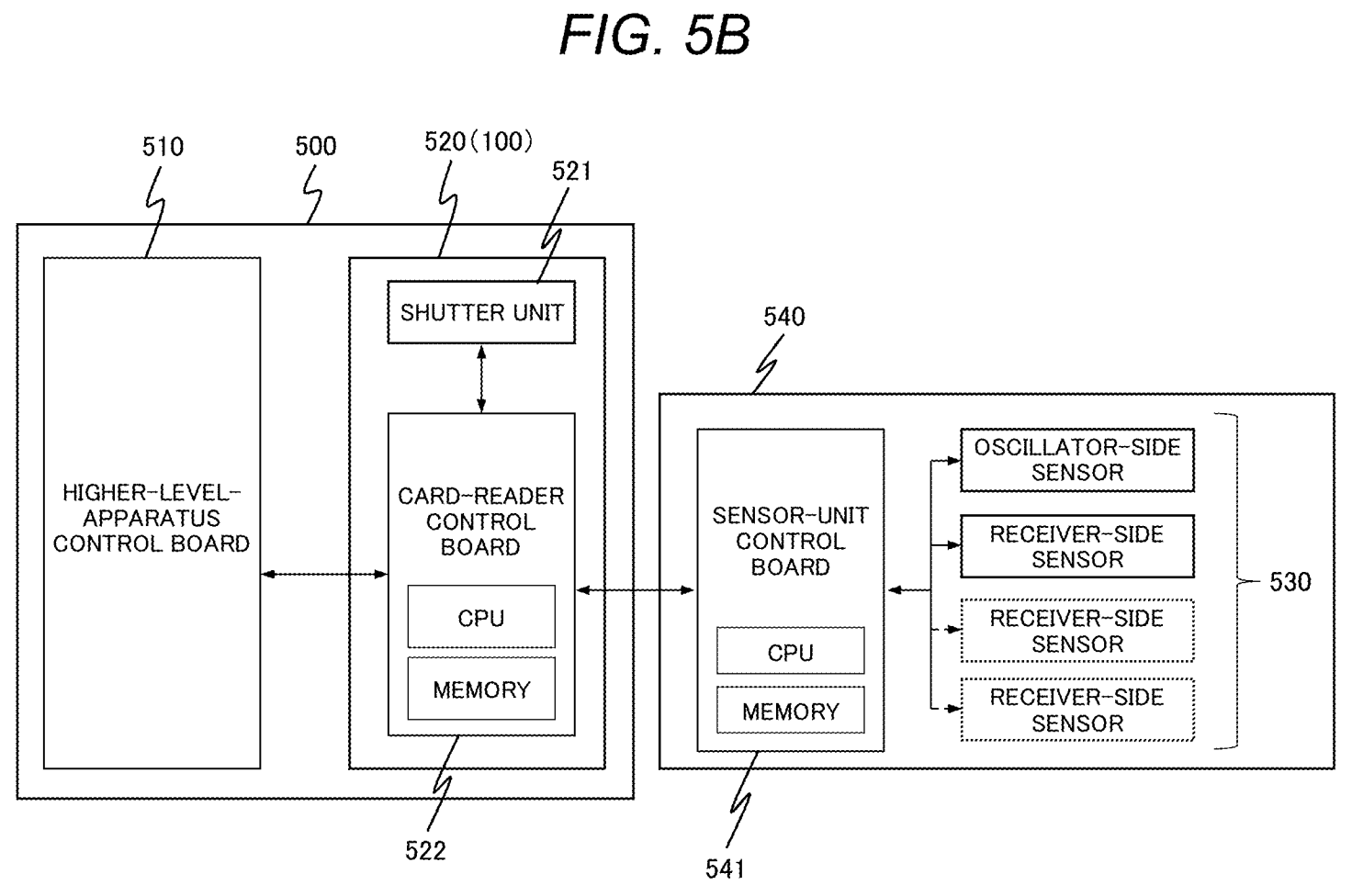

530
OSCILLATOR-SIDE SENSOR
RECEIVER-SIDE SENSOR
RECEIVER-SIDE SENSOR
RECEIVER-SIDE SENSOR
540
SENSOR-UNIT CONTROL BOARD
CPU
MEMORY
541
521
SHUTTER UNIT
520(100)
CARD-READER CONTROL BOARD
CPU
MEMORY
522
500
510
HIGHER-LEVEL-APPARATUS CONTROL BOARD

CARD READER

CLAIM OF PRIORITY

The present application claims priority from Japanese Patent application serial no. 2024-088456, filed on May 31, 2024, the content of which is hereby incorporated by reference into this application.

BACKGROUND OF THE INVENTION

The present invention relates to a card reader that reads magnetic stripe information included in a card.

A technique called skimming, for example, is used for unauthorized acquisition of information on magnetic cards used in transaction processing apparatuses such as automatic teller machines (ATMs). Skimming works of installing, in a transaction processing apparatus or other such apparatus, a device (skimmer) equipped with a magnetic head used for unauthorized acquisition of magnetic data, and acquiring magnetic data on the magnetic card in an unauthorized manner by use of the magnetic head.

In such skimming, the skimmer is typically installed in such a way that the magnetic header fits over the magnetic card slot of the transaction processing apparatus or other such apparatus. To counteract this, a jamming magnetic field is generated near the slot to prevent unauthorized reading of magnetic data.

Meanwhile, recent years have also seen the emergence of a new scheme to evade the above-mentioned jamming magnetic field generated near the slot of the transaction processing apparatus or other such apparatus. According to the scheme, a thin skimmer equipped with a small magnetic head is inserted deep into the card feed path from the slot to enable unauthorized acquisition of magnetic data while bypassing the jamming magnetic field.

As exemplary measures against such a new scheme, some proposed techniques detect attachment of a skimming device inside a card reader (see, for example, Japanese Unexamined Patent Application Publications Nos. 2020-024537 and 2017-219971).

According to such techniques, attachment of a small skimmer can be detected by a sensor such as a metallic sensor or capacitive sensor installed inside the card reader. Upon detection of attachment of the above-mentioned device, a predetermined alarm notification is generated. This makes it possible to prevent unauthorized reading of magnetic data.

SUMMARY OF THE INVENTION

The existing techniques mentioned above, however, rely on a sensor such as a metallic sensor or capacitive sensor to detect a skimmer. This may make reliable detection difficult in some cases depending on factors such as the material, attachment location, or size of a component covering the electronic circuit of the skimmer. Another issue is that, to ensure reliable detection of a skimming device over an extensive area inside the card reader, it is necessary to install a large number of sensors. This may lead to increased manufacturing cost.

Another countermeasure would be to make the space inside the card feed path of the card reader narrower in height. This makes it impossible to load the card into the card reader with a skimmer being installed inside the feed path. A problem with this approach, however, is that the narrower space inside the feed path can increase the risk of the card becoming stuck.

To solve the above mentioned problem, the present invention is a card reader for reading magnetic information while feeding, through a feed path, a card inserted into the card reader. The card reader includes: an oscillator configured to emit an ultrasonic wave to the feed path; and a receiver configured to receive the ultrasonic wave emitted from the oscillator. The card reader is configured to detect an object present in the feed path by comparing a first received waveform and a second received waveform with each other, the first received waveform being a waveform received at the receiver, the second received waveform being a previously acquired waveform under normal condition received at the receiver.

According to the configuration mentioned above, a skimmer is detected based on received waveforms of an ultrasonic wave that propagates inside the card reader. This allows the skimmer to be detected with improved reliability irrespective of factors such as the material, attachment location, or size of a component constituting the skimmer. Further, the configuration mentioned above allows for reduced number of sensors required to ensure reliable detection of a skimming device over an extensive area inside the card reader. This makes it possible to mitigate an increase in cost.

Further, the configuration mentioned above eliminates the need to excessively reduce the height of the space inside the card feed path. This may also eliminate problems such as an increased risk of the card becoming stuck during authorized transactions.

Other object and novel feature will be apparent from the description and appended drawings of the present specification.

BRIEF DESCRIPTION OF THE DRAWINGS

FIG. 5B is a control block diagram of a card reader according to an embodiment of the invention;

DETAILED DESCRIPTION

One embodiment of the invention will now be described with reference to the drawings.

First Embodiment

Figure 1A:
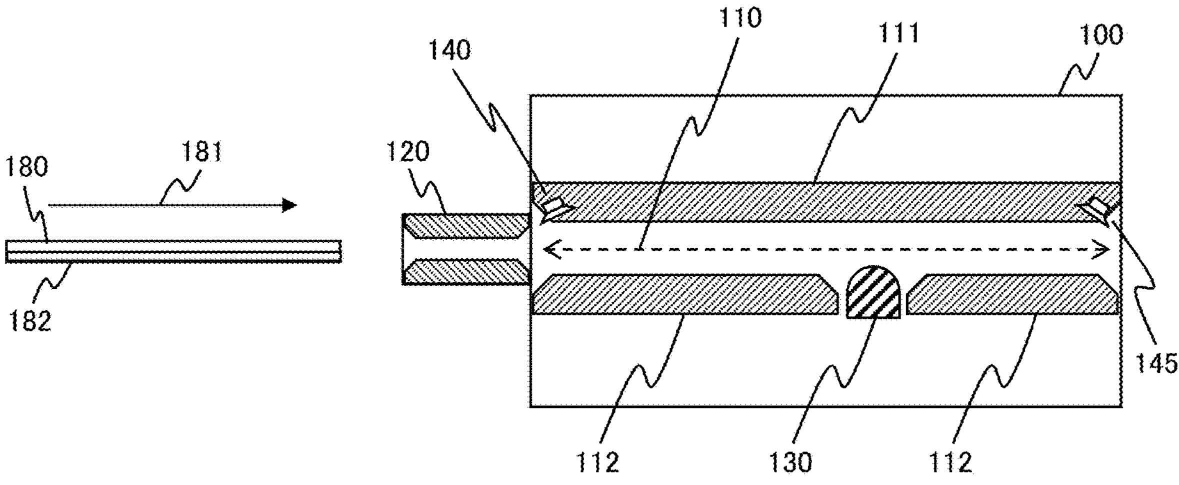
FIG. 1A is a schematic cross-sectional view of the major parts of a card reader according to an embodiment of the invention.
Figure 1B:
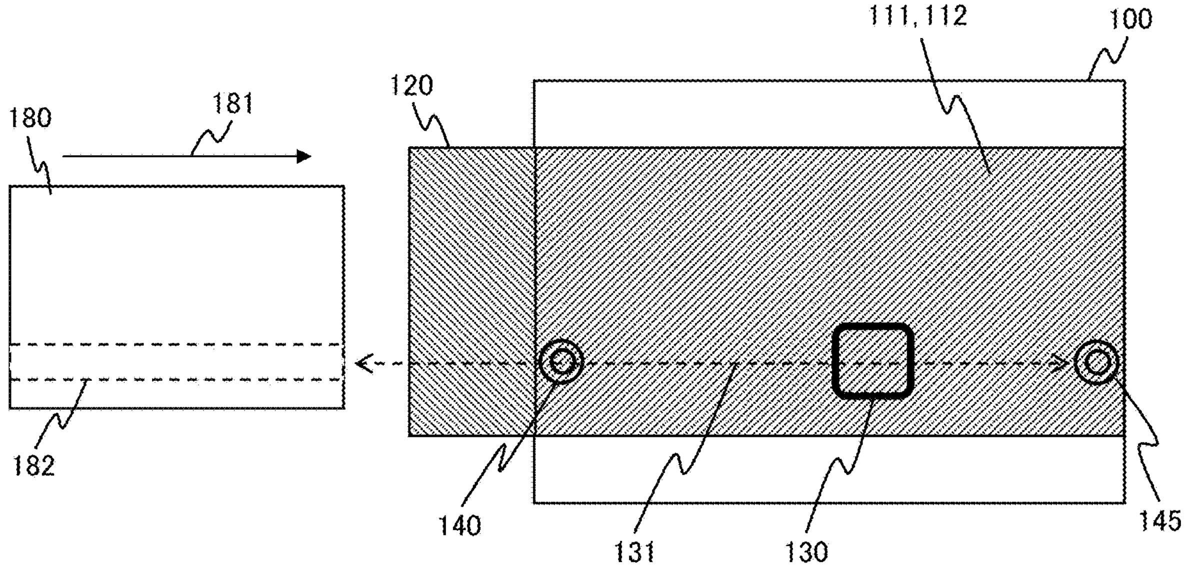
FIG. 1B is a schematic see-through view of a card reader according to an embodiment of the invention as seen from above.

FIGS. 1A and 1B illustrate a card reader 100 according to a first embodiment, of which FIG. 1A is a schematic cross-sectional view of the major parts of the card reader 100, and FIG. 1B is a schematic see-through view of the card reader 100 as seen from above. A card 180 is inserted from a slot 120 in a direction indicated by an arrow 181. Inside the card reader 100, an upper feed guide 111 and a lower feed guide 112 define a feed path through which the card is fed. As the card 180 is fed between these feed guides by a feed roller or other such part (not illustrated) in a direction indicated by a dashed arrow 110, information recorded on a magnetic stripe 182 on the underside of the card 180 is read by a magnetic head 130.

According to the first embodiment, the space between the upper feed guide 111 and the lower feed guide 112 serves as the feed path. For convenience, however, the dashed arrow 110 is herein sometimes referred to as feed path 110. It is to be appreciated that FIGS. 1A and 1B are schematic illustrations for explaining the first embodiment, and the dimensions, proportions, or other details of various parts in these figures need not necessarily be identical to those of the actual device.

The card reader 100 is provided with an oscillator 140 and a receiver 145, which represent characteristic components according to the first embodiment. The oscillator 140 emits an ultrasonic wave into the feed path 110. The receiver 145 detects and receives the ultrasonic wave emitted from the oscillator 140. The ultrasonic wave emitted by the oscillator 140 propagates to the receiver 145 while being reflected inside the feed path 110. At the receiver 145, the ultrasonic wave is observed as a received waveform.

Figure 2A:
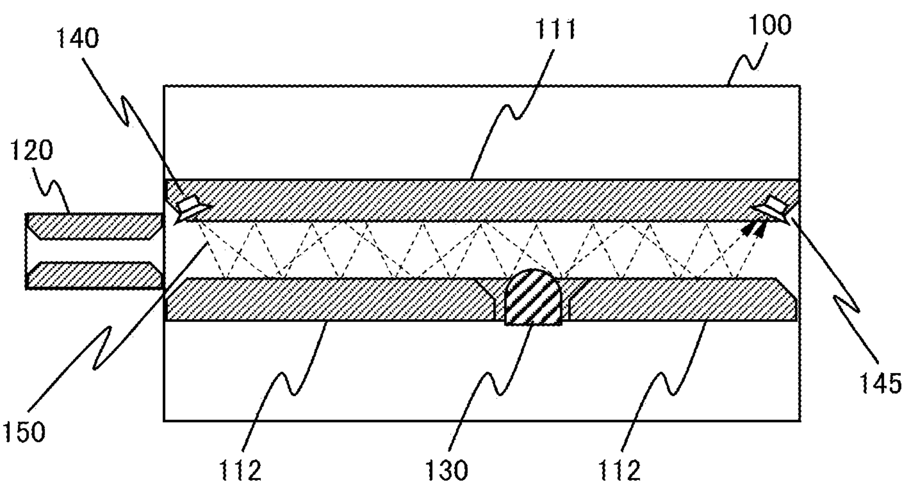
FIG. 2A is a diagram illustrating ultrasonic wave propagation according to an embodiment of the invention.

FIG. 2A is a diagram illustrating how the ultrasonic wave propagates at this time. In FIG. 2A, dashed arrows 150 each representing the ultrasonic wave propagating at this time are added to the cross-sectional view of FIG. 1A. The ultrasonic wave 150 emitted from the oscillator 140 into the feed path (the space between the feed guides 111 and 112) propagates rearward to the receiver 145 while undergoing reflections between the upper and lower guides.

Figure 2B:
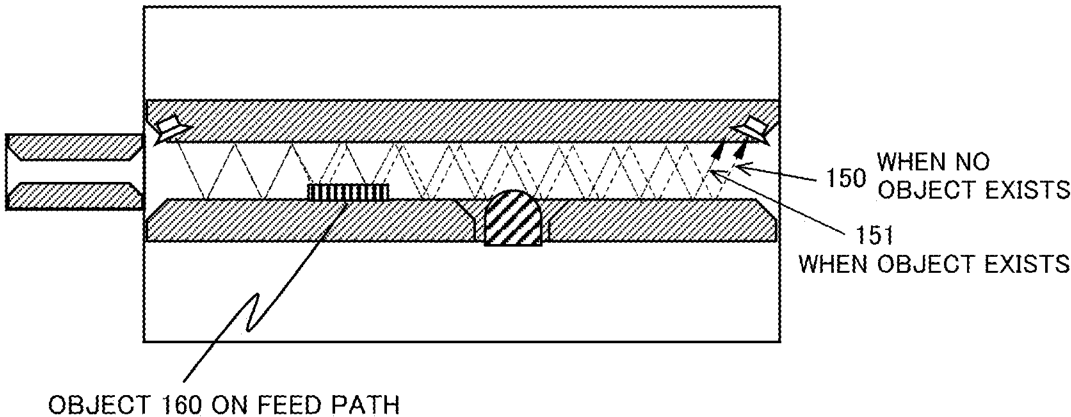
FIG. 2B is a diagram illustrating ultrasonic wave propagation according to an embodiment of the invention.

The received waveform obtained at this time is not a waveform due to a single reflection but a waveform due to a combination of multiple reflections (echoes). In this case, if an object 160 (e.g., a skimmer) is present in the feed path (if an abnormality is present) as illustrated in FIG. 2B, the reflection path of the emitted ultrasonic wave changes. This causes the received waveform at the receiver 145 to change from a waveform representing a condition with no object present (normal condition). According to the first embodiment, such a change in waveform is used to identify whether an object is present.

Figure 3A:
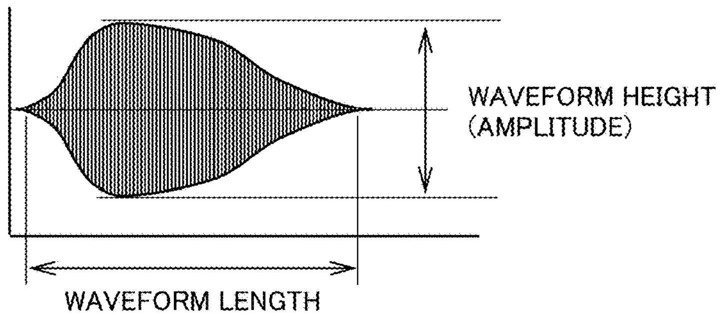
FIG. 3A illustrates an example of a received waveform according to an embodiment of the invention.
Figure 3B:
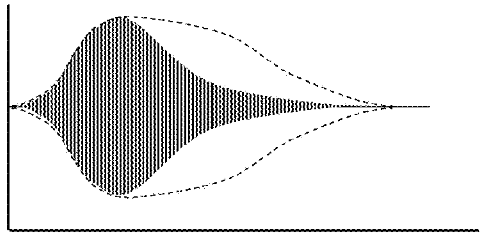
FIG. 3B illustrates an example of a received waveform according to an embodiment of the invention.
Figure 3C:
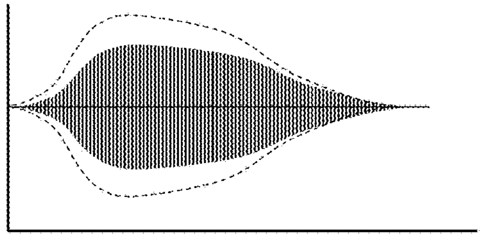
FIG. 3C illustrates an example of a received waveform according to an embodiment of the invention.
Figure 3D:
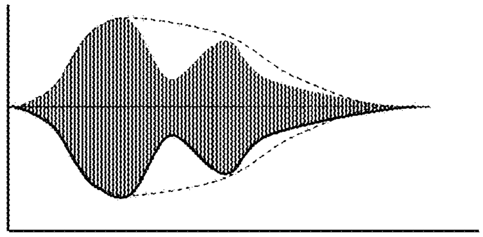
FIG. 3D illustrates an example of a received waveform according to an embodiment of the invention.

FIGS. 3A to 3D illustrate examples of how a waveform received at the receiver 145 changes depending on whether an object is present. The waveform represents a waveform obtained when an ultrasonic wave is emitted from the oscillator 140 for a predetermined unit time and received at the receiver 145. The horizontal axis represents time, and the vertical axis represents signal strength. FIG. 3A represents a case where no object is present. FIGS. 3B to 3D each represent a case where an object is present. Dashed lines in FIGS. 3B to 3D represent, for the purpose of comparison, the outer edges of the waveform illustrated in FIG. 3A. In the case illustrated in FIG. 3B, the waveform exhibits a decreased overall length. In the case illustrated in FIG. 3C, the waveform exhibits a decreased amplitude. In the case illustrated in FIG. 3D, the waveform exhibits a decreased amplitude at a point along the waveform.

The presence or absence of an object can be determined from the heights and lengths of these waveforms, and the tendencies of increase or decrease thereof. Examples of the method for making the determination may include: a determination based on the difference from a reference value set from the height and length of a waveform obtained when no object is present; analysis of differences based on image/waveform analysis; and machine learning.

As for the positioning of the oscillator 140 and the receiver 145 in the direction of the feed path 110, the oscillator 140 and the receiver 145 are depicted in FIG. 1A as being disposed at the upper feed guide 111, respectively in an end portion of the feed path 110 near the slot 120 and in an end portion opposite therefrom. Alternatively, however, the oscillator 140 and the receiver 145 may be disposed at positions other than those mentioned above. For example, with the arrangement mentioned above, it may be possible to reverse the relative positions of the oscillator 140 and the receiver 145, it may be possible to install both the oscillator 140 and the receiver 145 at the lower feed guide 112, or it may be possible to install one of the oscillator 140 and the receiver 145 at the upper feed guide 111 and the other at the lower feed guide 112.

It is not necessarily required to install the oscillator 140 and the receiver 145 in opposite end portions of the feed path 110. The oscillator 140 and the receiver 145 may be installed generally outside of an area where a skimmer may be installed in the feed path 110. In other words, the oscillator 140 and the receiver 145 may be positioned in any way as long as installation of a skimmer exerts an influence on the ultrasonic wave emitted from the oscillator 140, and the influence can be detected by the receiver 145. Even if the oscillator 140 and the receiver 145 are positioned in close proximity to each other, detection is still possible depending on the thickness or size of the skimmer.

Further, a plurality of oscillators 140 and a plurality of receivers 145 may be installed. In this case, ultrasonic waves from the oscillators are combined for reception at each of the receivers. At this time, even if no change in received waveform is observed at some receiver, if a change in received waveform is observed at another receiver, it can be determined that an object is present.

As for the positioning of the oscillator 140 and the receiver 145 in the lateral direction, in FIG. 1B, a skimmer is typically disposed on a magnetic stripe line 131 (i.e., at the position of the magnetic head 130) to read the magnetic stripe of an inserted card. Accordingly, the oscillator 140 and the receiver 145 are disposed on the magnetic stripe line 131. Alternatively, however, the oscillator 140 and the receiver 145 may be disposed at positions other than those mentioned above.

Figure 4A:
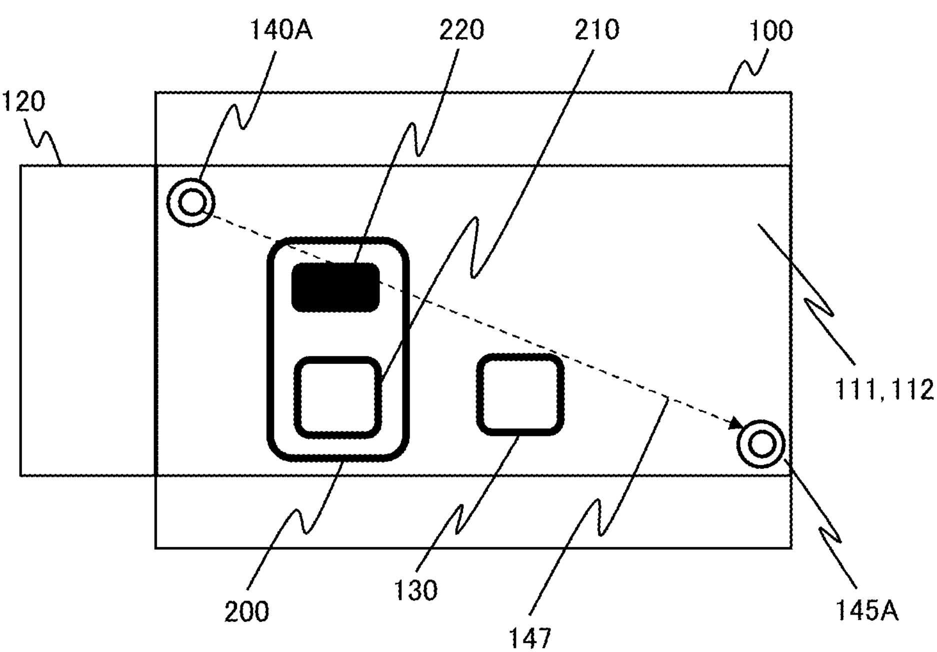
FIG. 4A is a schematic see-through view of a card reader according to an embodiment of the invention as seen from above.

For example, a case is considered where a skimmer 200 including a magnetic head 210 and a circuit component 220 is attached as in the top view illustrated in FIG. 4A. In this case, if the magnetic head 210 is in the form of an extremely thin plate as will be described later, this may make detection impossible with the oscillator 140 and the receiver 145 being positioned as illustrated in FIG. 1B. This issue, however, can be addressed as follows: If the circuit component 220 has a suitable thickness greater than or equal to that of the magnetic head 210, then as illustrated, an oscillator 140A and a receiver 145A are disposed diagonally to each other (one disposed, at a side near the slot 120, in an end portion of the feed path 110 in the feed direction opposite from the magnetic head 130 with respect to the transverse direction of the card, and one disposed, at a side opposite from the slot 120, in an end portion of the feed path 110 in the feed direction near the magnetic head 130) with respect to the direction of card feed in the feed path 110 (the upper feed guide 111 and the lower feed guide 112). In this way, the circuit component 220 is positioned in a principal path 147 of the ultrasonic wave, and consequently exerts a large influence on the received waveform. This makes it possible to detect the circuit component 220 of the skimmer 200.

Figure 4B:
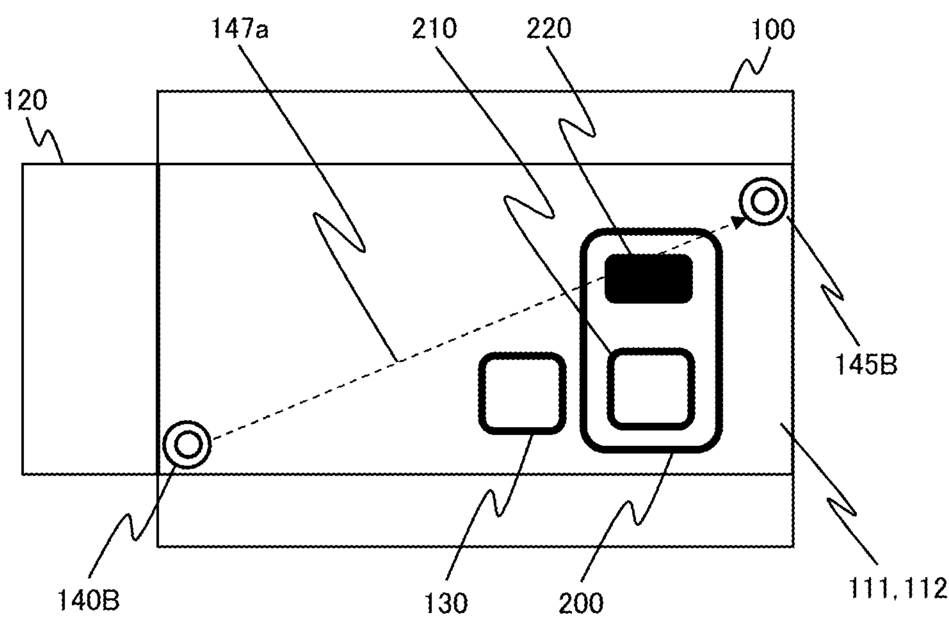
FIG. 4B is a schematic see-through view of a card reader according to an embodiment of the invention as seen from above.

FIG. 4B illustrates a case where the skimmer 200 is installed at a side opposite from the slot 120 with respect to the magnetic head 130. In this case, at a side near the slot 120, with respect to the transverse direction of the card, an oscillator 140B is disposed in an end portion of the feed path 110 in the feed direction near the magnetic head 130, and at a side opposite from the slot 120, a receiver 145B is disposed in an end portion of the feed path 110 in the feed direction opposite from the magnetic head 130. In this way, the circuit component 220 is positioned in a principal path 147*a* of the ultrasonic wave, and consequently exerts a large influence on the received waveform. This makes it possible to detect the circuit component 220 of the skimmer 200.

In each of FIGS. 4A and 4B, the oscillator and the receiver may be swapped in position, and may be disposed at positions other than end portions of the feed path 110 in the feed direction. The configuration in FIG. 4A and the configuration in FIG. 4B may be combined. That is, a configuration may be employed in which oscillators and receivers are disposed, one at each of the four corners of the interior of the feed path (a configuration including two oscillators and two receivers). In this case, a skimmer can be determined to be present if a change in waveform is observed at any one of the receivers.

Figure 5A:
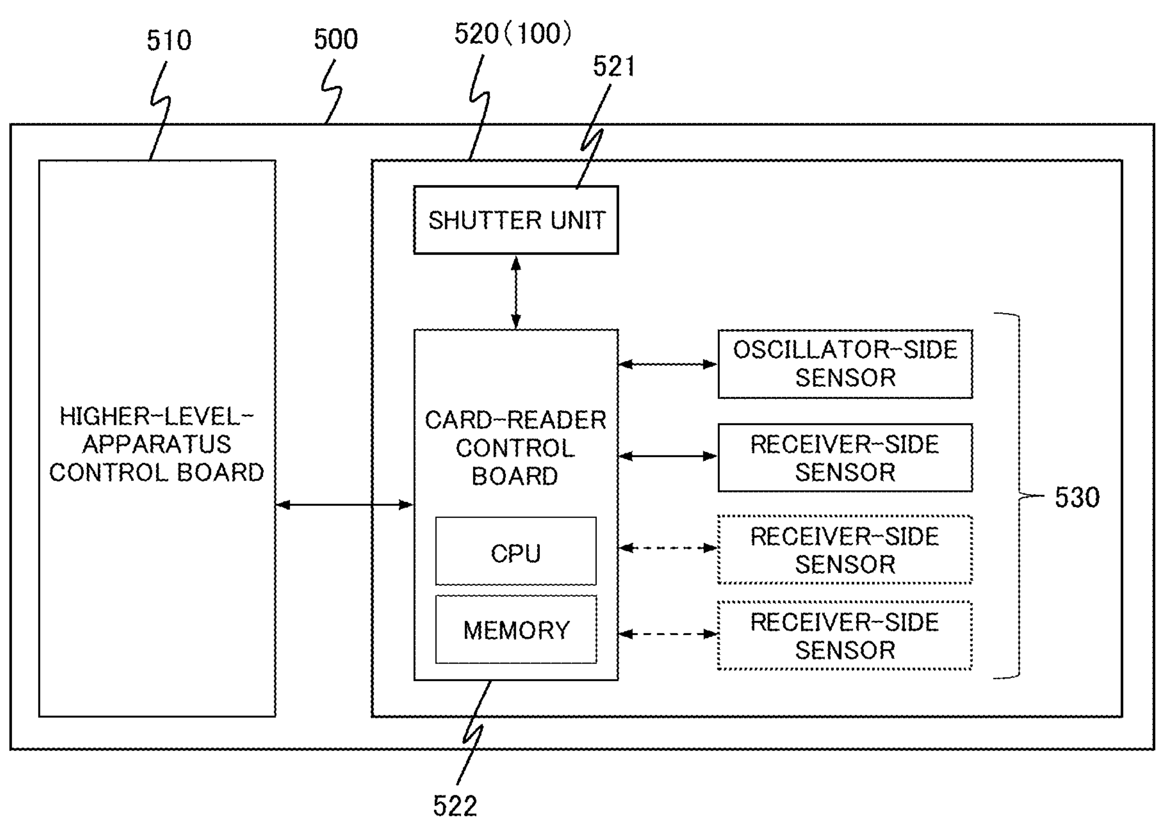
FIG. 5A is a control block diagram of a card reader according to an embodiment of the invention.

A control mechanism of a card reader according to the first embodiment will now be described with reference to control block diagrams illustrated in FIGS. 5A and 5B. In FIG. 5A, a card reader is incorporated in a higher-level apparatus 500 such as an ATM. A higher-level-apparatus control board 510 controls various parts of the higher-level apparatus. A card reader 520 (100) controls operation of various parts including a shutter unit 521 by means of a card-reader control board 522. As required, the card-reader control board 522 operates in conjunction with the higher-level-apparatus control board 510 to execute a predetermined control. Oscillator- and receiver-side sensors 530 correspond to the oscillator 140 and the receiver 145 in FIG. 1A or other figures. The card-reader control board 522 executes processes including detection of a skimmer by controlling operation of the oscillator- and receiver-side sensors 530, and closing of the shutter unit 521 after skimmer detection. The card-reader control board 522 includes, for example, a built-in program to execute a control for skimmer detection, other than the normal control to be executed by the card reader.

FIG. 5B illustrates another exemplary control mechanism of the card reader according to the first embodiment. A skimmer detector according to the first embodiment is modularized as a sensor unit 540, with a dedicated control board (a sensor-unit control board 541) provided to control operation of the oscillator- and receiver-side sensors 530. In this way, a skimmer detection function according to the first embodiment can be efficiently incorporated by retrofitting into an existing card reader. The sensor-unit control board 541 operates in conjunction with the card-reader control board 522 to execute processes including detection of a skimmer by controlling operation of the oscillator- and receiver-side sensors 530, and closing of the shutter unit 521 after skimmer detection.

FIGS. 5A and 5B do not depict a mechanism/mechanical parts not directly related to the skimmer detection or other processes according to the first embodiment.

Figure 6:
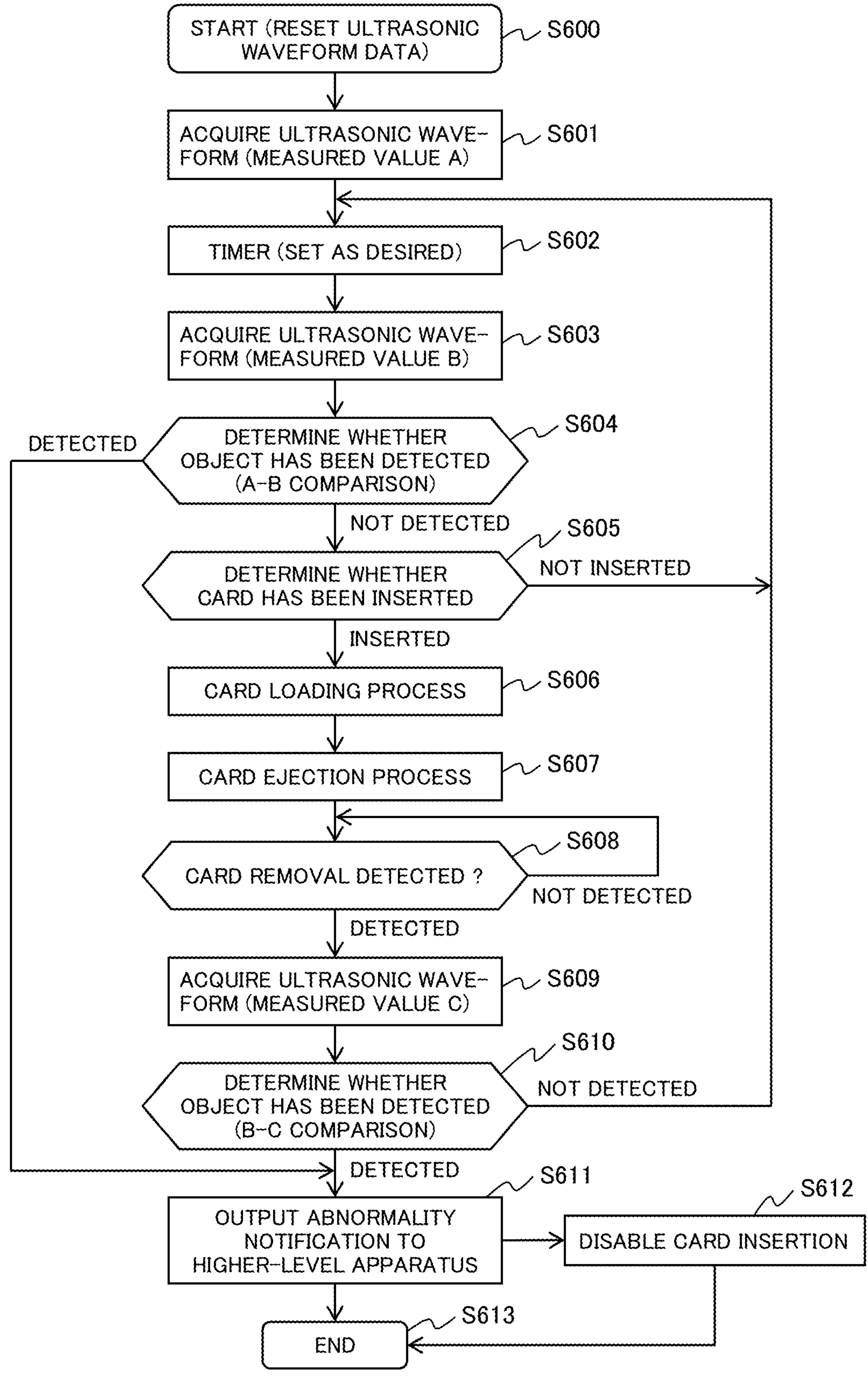
FIG. 6 is a flowchart of processing according to an embodiment of the invention.

The skimmer detection process to be executed by the card reader according to the first embodiment will now be described with reference to the flowchart illustrated in FIG. 6.

First, an ultrasonic waveform previously acquired and stored in a memory or other storage of the control board 522 and/or the control board 541 is reset. The oscillator 140 and the receiver 145 are then activated, and ultrasonic waveform data (Measured Value A) is acquired anew (steps S600 and S601). In a case where no object is present in the feed path, a received waveform may change from its initial state immediately after installation of the apparatus, due to factors such as environmental conditions including the ambient temperature and humidity of the ultrasonic sensors (the oscillator 140 and the receiver 145), accumulation of dust, and changes in the state of the apparatus due to aging. From the viewpoint of preventing erroneous detection caused by such disturbances, the waveform to be used as a reference in determining the presence or absence of an object is desirably the latest waveform received when no object is present.

Subsequently, after the elapse of a given time set with a timer (step S602), ultrasonic waveform data (Measured Value B) is acquired (step S603). As for the meaning of the term "after the elapse of a given time", for example, the data acquisition may be executed every hour for regions with high incidences of skimming, may be executed upon activation of the apparatus every day, or may be executed every half-day.

Subsequently, the ultrasonic waveform data (Measured Value A) acquired at step S601, and the ultrasonic waveform data (Measured Value B) acquired at step S603 are compared with each other to determine whether an object has been detected (step S604). In this regard, external factors such as environmental conditions including temperature and humidity, accumulation of dust, and changes in the state of the apparatus due to aging cause only a small change in ultrasonic waveform, whereas the addition of an object to the feed path causes a marked change in ultrasonic waveform.

This can be utilized to determine whether a difference in waveform between Measured Values A and B is due to the presence of an added object in the feed path or due to an external factor. Although the present procedure is executed repeatedly every predetermined time managed by the timer at step S602, after the determination is executed for the first time, the determination may be made by comparing the data of Measured Value B with the last measured data of Measured Value B. This checking may be executed continuously to allow constant determination of the presence or absence of an object in the feed path.

If it is determined at step S604 that an object has been detected, then at step S611, an output (notification) indicating that an abnormality has been detected is provided to the higher-level apparatus or other such apparatus (step S611). The shutter at the slot of the card reader is then closed to disallow subsequent card insertions (step S612), and the series of processing ends. Upon receiving an abnormality notification at step S611, the upper-level apparatus can take measures such as stopping its operation and notifying a further higher-level system to thereby prevent information from being extracted by the skimmer. If the card reader itself is equipped with a mechanism for preventing card insertion, it is also possible to, without a command from the higher-level apparatus, prevent the card from being loaded into the card reader, and consequently prevent information from being extracted by the skimmer. The processing at step S612 may be omitted.

Returning now to step S604, if it is determined that an object has not been detected ("not detected"), it is then determined whether a card has been inserted (step S605). In this way, it is determined whether a transaction or other processing has been initiated. The determination of whether a card has been inserted is made by means of, for example, an insertion sensor or other such sensor disposed near the slot of the card reader. If no card is determined to have been inserted, the processing returns to step S602, and the subsequent procedure is repeated.

If it is determined at step S605 that a card has been inserted, then at step S606, the card is loaded from the feed path for execution of processing, such as reading of magnetic stripe data from the card and a predetermined process to be executed by the higher-level apparatus (e.g., a transaction process to be executed by the ATM). Then, a card ejection process is executed (step S607).

Subsequently, upon detecting removal of the card by the user ("detected" at step S608), ultrasonic waveform data (Measured Value C) is acquired after the card removal, in order to determine whether an object (e.g., a skimmer) has been intentionally left inside the feed path (step S609). Then, the ultrasonic waveform data (Measured Value B) acquired at step S603, and the ultrasonic waveform data (Measured Value C) acquired at step S609 are compared with each other, to thereby determine whether an object has been detected (step S610).

If it is determined at step S610 that an object has been detected, the processing from step S611 onward described above is executed. If it is determined at step S610 that no object has been detected, the processing returns to step S602, and the processing from the ultrasonic waveform data acquisition (step S603) onward is repeated after the elapse of the predetermined time.

If the determination of whether an object has been detected is to be made by machine learning, substantial amounts of ultrasonic waveform data in a state in which an object is absent and the object is present may be acquired in advance under various conditions, to thereby construct a machining learning model. Then, at steps S604 and S610, the determination of whether an object has been detected may be made with respect to Measured Values B and C, respectively, by using the constructed machining learning model.

As described above, according to the first embodiment, the presence or absence of a foreign object is detected based on received waveform data representing a received waveform of an ultrasonic wave that propagates inside the card reader. This configuration allows for reliable detection of the foreign object irrespective of factors such as the material, attachment location, or size of a component constituting a skimmer. Further, even when it is desired to ensure reliable detection of a skimming device over an extensive area inside the card reader, it is not necessarily required to install a large number of sensors. This helps to prevent an increase in manufacturing cost.

Second Embodiment

According to a modification, to improve the accuracy of object detection, the shape of the frame in the feed path section of the card reader may be changed, or a plurality of oscillators and receivers may be used in combination. This makes it possible to not only improve the accuracy of detection of an object but also determine the location of the object. According to another modification, ultrasonic wave emission and reception may be executed by a single sensor to inexpensively implement the functionality of ultrasonic wave emission and reception. The following description of a second embodiment will be directed to the modifications mentioned above.

Figure 7A:
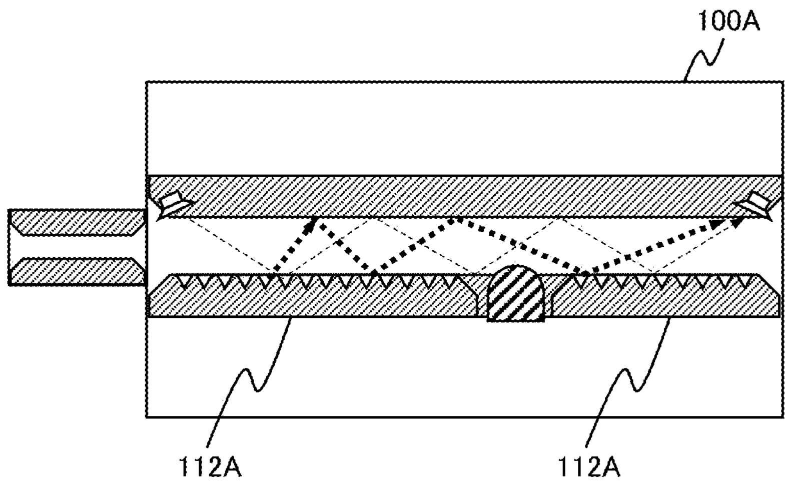
FIG. 7A is a schematic cross-sectional view of the major parts of a card reader according to an embodiment of the invention.

With the configuration of the card reader described above with reference to the first embodiment, if the object to be detected is extremely thin, there is a possibility that the resulting change in the state of reflection of the ultrasonic wave is small and unidentifiable. To address this, according to the configuration illustrated in FIG. 7A, the upper surface of a lower feed guide 112A is provided with irregularities. This intentionally causes diffuse reflection of an ultrasonic wave propagating in the feed path, or increases the degree of such diffuse reflection.

Figure 7B:
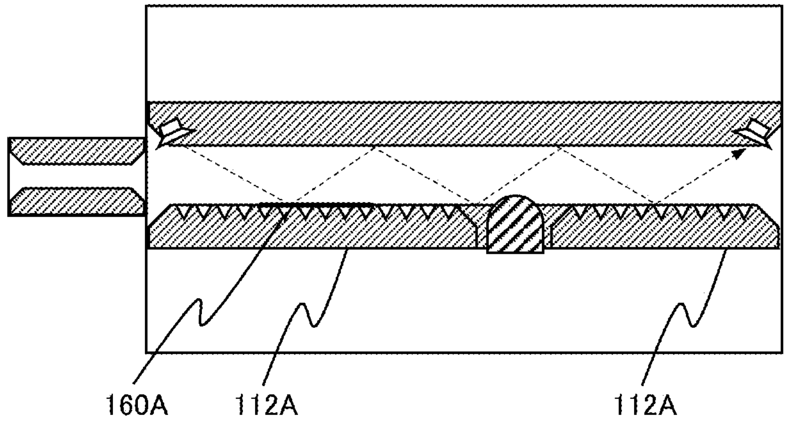
FIG. 7B is a schematic cross-sectional view of the major parts of a card reader according to an embodiment of the invention.

Now, a case is considered where a thin object 160A as illustrated in FIG. 7B is attached to the card reader configured as described above. In this case, at the surface of the object 160A, either no diffuse reflection occurs or the degree of diffuse reflection decreases. This results in increased change in the received waveform at the receiver due to the object 160A, thereby making it possible to detect the presence of the object 160A.

Figure 8A:
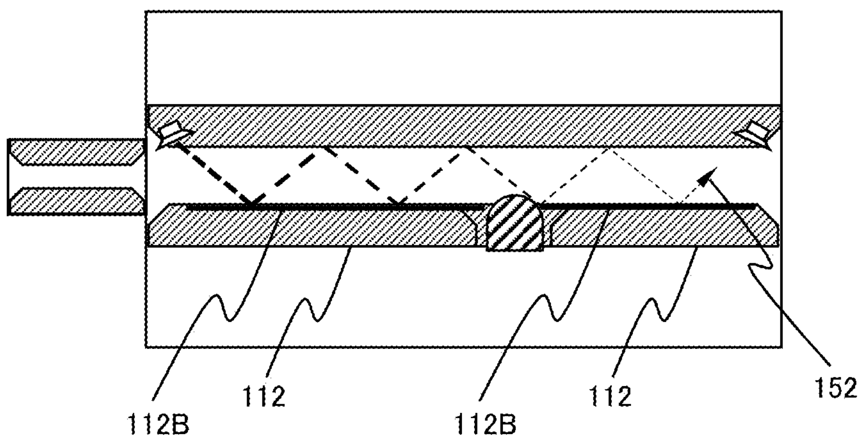
FIG. 8A is a schematic cross-sectional view of the major parts of a card reader according to an embodiment of the invention.

Another exemplary configuration for increasing the change in received waveform due to an object is illustrated in FIG. 8A, in which an ultrasonic absorber 112B is attached to the surface of the lower feed guide 112. In this case, an ultrasonic wave 152 propagates while undergoing attenuation, resulting in significant attenuation of the signal received at the receiver.

Figure 8B:
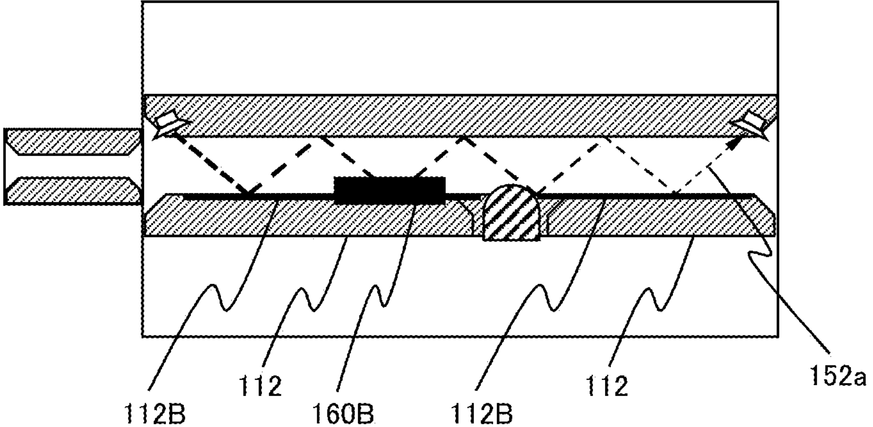
FIG. 8B is a schematic cross-sectional view of the major parts of a card reader according to an embodiment of the invention.

Now, a case is considered where a thin object 160B as illustrated in FIG. 8B is attached to the card reader configured as described above. In this case, an ultrasonic wave 152*a* is less likely to undergo attenuation at the surface of the object 160B. This allows the resulting received waveform to increase in magnitude relative to that when the object 160B is not present (FIG. 8A), thereby making it possible to detect the presence of the object 160B.

Figure 9:
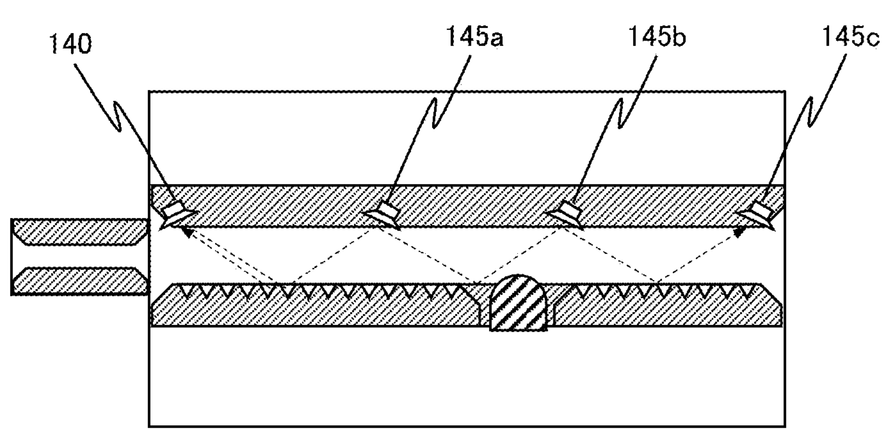
FIG. 9 is a schematic cross-sectional view of the major parts of a card reader according to an embodiment of the invention.

FIG. 9 illustrates an exemplary configuration of the card reader according to another modification in which a plurality of receivers 145*a*, 145*b*, and 145*c* are provided with respect to the oscillator 140. In this case, if an object is attached to the feed path, the object can be detected with improved accuracy through observation of changes in the respective waveforms received by the receivers 145*a*, 145*b*, and 145*c*. Further, since which receiver experiences a greater degree of change in received waveform varies with where an attached object is located in the feed path, the location of the attached object can be roughly estimated through comparison of the degrees of change observed at the respective receivers. According to this modification, to accentuate the influence that the presence of an object has on the received waveform, the lower feed guide has a shape with irregularities (ridges) similar to those illustrated in FIGS. 7A and 7B. Alternatively, however, the lower feed guide may have a flat shape.

Figure 10:
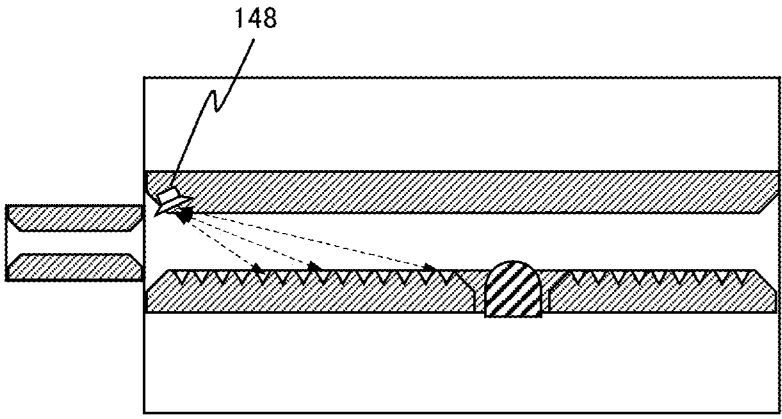
FIG. 10 is a schematic cross-sectional view of the major parts of a card reader according to an embodiment of the invention.

FIG. 10 illustrates a configuration of the card reader according to still another modification. In this modification, an ultrasonic sensor 148 is used in which both ultrasonic wave emission and reception can be performed with a single component. According to this modification as well, to ensure that the ultrasonic sensor 148 be capable of receiving a predetermined amount of the ultrasonic wave emitted by the ultrasonic sensor 148 itself, the lower feed guide has a shape with irregularities (ridges) similar to those illustrated in FIGS. 7A and 7B. As for the angle of the ridges, the angle may be varied in accordance with the location/angle of the ultrasonic sensor 148, rather than being constant. Further, the lower feed guide may have a flat shape rather than a shape with irregularities (ridges).

REFERENCE SIGNS LIST

100: card reader
110: feed path
111: upper feed guide
112: lower feed guide
120: slot
130: magnetic head
140: oscillator
145: receiver
180: card
182: magnetic stripe

What is claimed is:

1. A card reader for reading magnetic information while feeding, through a feed path, a card inserted into the card reader, the card reader comprising:

a first end including an opening;

a second end opposite the first end;

a feed path connecting the first end to the second end and configured to guide the card through the card reader;

an oscillator configured to emit an ultrasonic wave to the feed path and located along the feed path at either the first end or the second end; and a receiver configured to receive the ultrasonic wave emitted from the oscillator and located along the feed path at either the first end or the second end and opposite the end where the oscillator is located, wherein the card reader is configured to detect an object present in the feed path by comparing a first received waveform and a second received waveform with each other, the first received waveform being a waveform received at the receiver, the second received waveform being a previously acquired waveform under normal condition received at the receiver.

2. The card reader according to claim 1, wherein the card reader is configured to, in response to a difference in waveform height and waveform length between the first received waveform and the second received waveform exceeding a predetermined value, determine that the object is present.

3. The card reader according to claim 1, wherein the card reader is configured to, based on a previously constructed machine-learning model, determine that the object is present from the first received waveform.

4. The card reader according to claim 1, wherein the oscillator and the receiver are each disposed on a line of passage of a magnetic stripe of the card in the feed path.

5. The card reader according to claim 2, wherein the oscillator and the receiver are disposed in opposite end portions of the feed path in a transverse direction of the card.

6. The card reader according to claim 4, wherein the card reader is configured to execute:

a first detection process of, before the card is inserted, acquiring the first received waveform, and detecting an object present in the feed path, and a second detection process of, in response to a determination as a result of the first detection process that no object is present, after the card is inserted and ejected, acquiring a third received waveform at the receiver, and detecting an object remaining after card ejection by comparing the first received waveform and the third received waveform with each other.

7. The card reader according to claim 1, wherein the feed path is defined by an upper feed guide and a lower feed guide, that both extend from the first end to the second end, and the lower feed guide has a surface provided with irregularities from the first end to the second end.

8. The card reader according to claim 1, wherein the feed path is defined by an upper feed guide and a lower feed guide, that both extend from the first end to the second end, and the lower feed guide has a surface provided with an ultrasonic absorber.

9. The card reader according to claim 1, wherein the receiver comprises a plurality of receivers disposed at different locations of the feed path.

10. The card reader according to claim 1, wherein the oscillator and the receiver comprise a single ultrasonic sensor capable of both ultrasonic wave emission and reception.

11. The card reader according to claim 1, wherein the feed path is defined by an upper feed guide and a lower feed guide, that both extend from the first end to the second end.

12. The card reader according to claim 11, wherein the oscillator and the receiver are both located on the upper feed guide.

13. The card reader according to claim 11, wherein the oscillator and the receiver are both located on the lower feed guide.

* * * * *